United States Patent
Yang et al.

(10) Patent No.: US 12,506,982 B2
(45) Date of Patent: Dec. 23, 2025

(54) CORRECTION METHOD AND DEVICE FOR HANDLING COLUMN FIXED PATTERN NOISE OF IMAGE SENSOR AND RELATED IMAGE SENSING DEVICE

(71) Applicant: Himax Imaging Limited, Tainan (TW)

(72) Inventors: Wei-Chieh Yang, Tainan (TW); Po-Chang Chen, Tainan (TW); Felix Su, Tainan (TW)

(73) Assignee: Himax Imaging Limited, Tainan (TW)

( * ) Notice: Subject to any disclaimer, the term of this patent is extended or adjusted under 35 U.S.C. 154(b) by 234 days.

(21) Appl. No.: 18/412,618

(22) Filed: Jan. 15, 2024

(65) Prior Publication Data

US 2025/0234105 A1    Jul. 17, 2025

(51) Int. Cl.
*H04N 25/671*  (2023.01)
*H04N 25/51*  (2023.01)
*H04N 25/628*  (2023.01)
*H04N 25/677*  (2023.01)
*H04N 25/78*  (2023.01)

(52) U.S. Cl.
CPC ........... *H04N 25/677* (2023.01); *H04N 25/51* (2023.01); *H04N 25/671* (2023.01); *H04N 25/78* (2023.01); *H04N 25/628* (2023.01)

(58) Field of Classification Search
CPC .... H04N 25/51; H04N 25/628; H04N 25/671; H04N 25/677; H04N 25/78
See application file for complete search history.

(56) References Cited

U.S. PATENT DOCUMENTS

| | | | | |
|---|---|---|---|---|
| 7,542,075 B2* | 6/2009 | Suzuki | | H04N 25/76 |
| | | | | 375/240 |
| 8,269,864 B2* | 9/2012 | Gerstenberger | | H04N 25/677 |
| | | | | 348/246 |

FOREIGN PATENT DOCUMENTS

| | | | |
|---|---|---|---|
| TW | 201143410 A1 | 12/2011 | |
| TW | 201729588 A | 8/2017 | |

* cited by examiner

*Primary Examiner* — Lin Ye
*Assistant Examiner* — Chriss S Yoder, III
(74) *Attorney, Agent, or Firm* — Winston Hsu (57) ABSTRACT

A correction device includes: an offset updating unit, a calculating unit and a gain stretching unit. The offset updating unit is configured to generate a plurality of updated offset values according to a plurality of base offset values, wherein each of the plurality of updated offset values corresponding to one column of pixel values among a plurality of columns of pixel values generated by an image sensor. The calculating unit is configured to generate a plurality of columns of corrected pixel values according to the plurality of updated offset values and the plurality of columns of pixel values. The gain stretching unit is coupled to the calculating unit and configured to determine a compensation gain according to the plurality of updated offset values and accordingly generate a plurality of columns of output pixel values according to the compensation gain and the plurality of columns of corrected pixel values.

15 Claims, 5 Drawing Sheets

FIG. 1

|  | Group_1 | Group_2 | | | | | | Group_K | | | | | |
|---|---|---|---|---|---|---|---|---|---|---|---|---|---|
| OP1 | BO_1_1 | BO_2_1 | | | | | | BO_K_1 | | | | | |
| OP2 | BO_1_2 | BO_2_2 | | | | | | BO_K_2 | | | | | |
| OP3 | BO_1_3 | BO_2_3 | | | | | | BO_K_3 | | | | | |
| OP4 | BO_1_4 | BO_2_4 | | | | | | BO_K_4 | | | | | |
| OP5 | BO_1_5 | BO_2_5 | | | | | | BO_K_5 | | | | | |
| ...... | ...... | ...... | | | | | | ...... | | | | | |
| OPL | BO_1_L | BO_2_L | | | | | | BO_K_L | | | | | |

(Base Offset Value)

FIG. 2

Look-Up Table

| Gain | A | B | C | D | E | F |
|---|---|---|---|---|---|---|
| Modification Factor | x0.14 | x0.27 | x0.29 | x0.52 | x1.00 | x2.00 |

CORRECTION METHOD AND DEVICE FOR HANDLING COLUMN FIXED PATTERN NOISE OF IMAGE SENSOR AND RELATED IMAGE SENSING DEVICE

BACKGROUND OF THE INVENTION

1. Field of the Invention

The present invention relates to image sensing, and more particularly to a correction method and device for handling column fixed pattern noise of image sensor and related image sensing device.

2. Description of the Prior Art

Fixed pattern noise (FPN) is a prevalent phenomenon in image sensors, primarily caused by manufacturing process variations, temperature changes, and aging of electronic components. It manifests as significant differences in brightness or color between certain fixed pixels and their neighboring pixels, with these discrepancies being consistent across multiple image frames.

Column fixed pattern noise (CFPN) represents a specific form of FPN, especially prevalent in CMOS-based image sensors. CFPN primarily results from slight variations in the manufacturing process of components in the readout circuits. These variations lead to differing degrees of voltage or digital value offset during the readout of each column of pixels, creating vertical stripe patterns in the images. In addressing the CFPN issue, a common approach involves measurement of readout circuit offset values during the later stages of sensor manufacturing. This includes precise measurement of the offset values for each readout circuit to obtain correction data, with the correction data subsequently stored in a correction device. During use, these stored correction data are employed to dynamically adjust the readout data for each column, thereby reducing or eliminating the effects of CFPN.

However, conventional CFPN correction methods encounter challenges under specific conditions. For instance, in high-brightness scenes where pixel values expectedly approach or reach saturation, applying conventional CFPN correction methods may excessively or incorrectly lower some pixel values to derive non-saturated pixel values, leading to unnatural stripes or spots in the image. Under these circumstances, the limitations of conventional CFPN correction methods are evident, necessitating more intelligent mechanisms capable of recognizing and adapting to varying shooting conditions.

SUMMARY OF THE INVENTION

With this in mind, it is object of the present invention to provide a correction method and device for handling CFPN of image sensors. Embodiments of the present invention relies on a gain stretching mechanism to provide a compensation gain for CFPN correction. The compensation gain can dynamically adjust pixel values that are corrected by CFPN correction, especially when dealing with pixels that approach or reach saturation. By amplifying these corrected pixel values, the embodiments of present invention effectively prevent the situation where CFPN correction based on readout circuit offset values excessively diminishes pixel values, thereby avoiding leading to unnatural stripes or spots in the images.

According to one embodiment, a correction method for handling column fixed pattern noise of an image sensor is provided. The correction method comprises: receiving a plurality of columns of pixel values generated by the image sensor; generating a plurality of updated offset values according to a plurality of base offset values, wherein each of the plurality of updated offset values corresponding to one column of pixel values among the plurality of columns of pixel values; generating a plurality of columns of corrected pixel values according to the plurality of updated offset values and the plurality of columns of pixel values; determining a compensation gain according to the plurality of updated offset values; and generating a plurality of columns of output pixel values according to the compensation gain and the plurality of columns of corrected pixel values.

According to one embodiment, a correction device for handling column fixed pattern noise of an image sensor is provided. The correction device comprises: an offset updating unit, a calculating unit and a gain stretching unit. The offset updating unit is configured to generate a plurality of updated offset values according to a plurality of base offset values, wherein each of the plurality of updated offset values corresponding to one column of pixel values among a plurality of columns of pixel values generated by the image sensor. The calculating unit is coupled to the offset updating unit and configured to generate a plurality of columns of corrected pixel values according to the plurality of updated offset values and the plurality of columns of pixel values. The gain stretching unit is coupled to the calculating unit and configured to determine a compensation gain according to the plurality of updated offset values and accordingly generate a plurality of columns of output pixel values according to the compensation gain and the plurality of columns of corrected pixel values.

According to one embodiment, an image sensing device is provided. The image sensing device comprises an image sensor and a correction device for handling column fixed pattern noise of the image sensor. The image sensor is configured to provide a plurality of columns of pixel values. The correction device comprises: an offset updating unit, a calculating unit and a gain stretching unit. The offset updating unit is configured to generate a plurality of updated offset values according to a plurality of base offset values, wherein each of the plurality of updated offset values corresponding to one column of pixel values among the plurality of columns of pixel values. The calculating unit is coupled to the offset updating unit and configured to generate a plurality of columns of corrected pixel values according to the plurality of updated offset values and the plurality of columns of pixel values. The gain stretching unit is coupled to the calculating unit and configured to determine a compensation gain according to the plurality of updated offset values and accordingly generate a plurality of columns of output pixel values according to the compensation gain and the plurality of columns of corrected pixel values.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment.

Furthermore, the particular features, structures or characteristics may be combined in any suitable combinations and/or sub-combinations in one or more embodiments.

Figure 1:
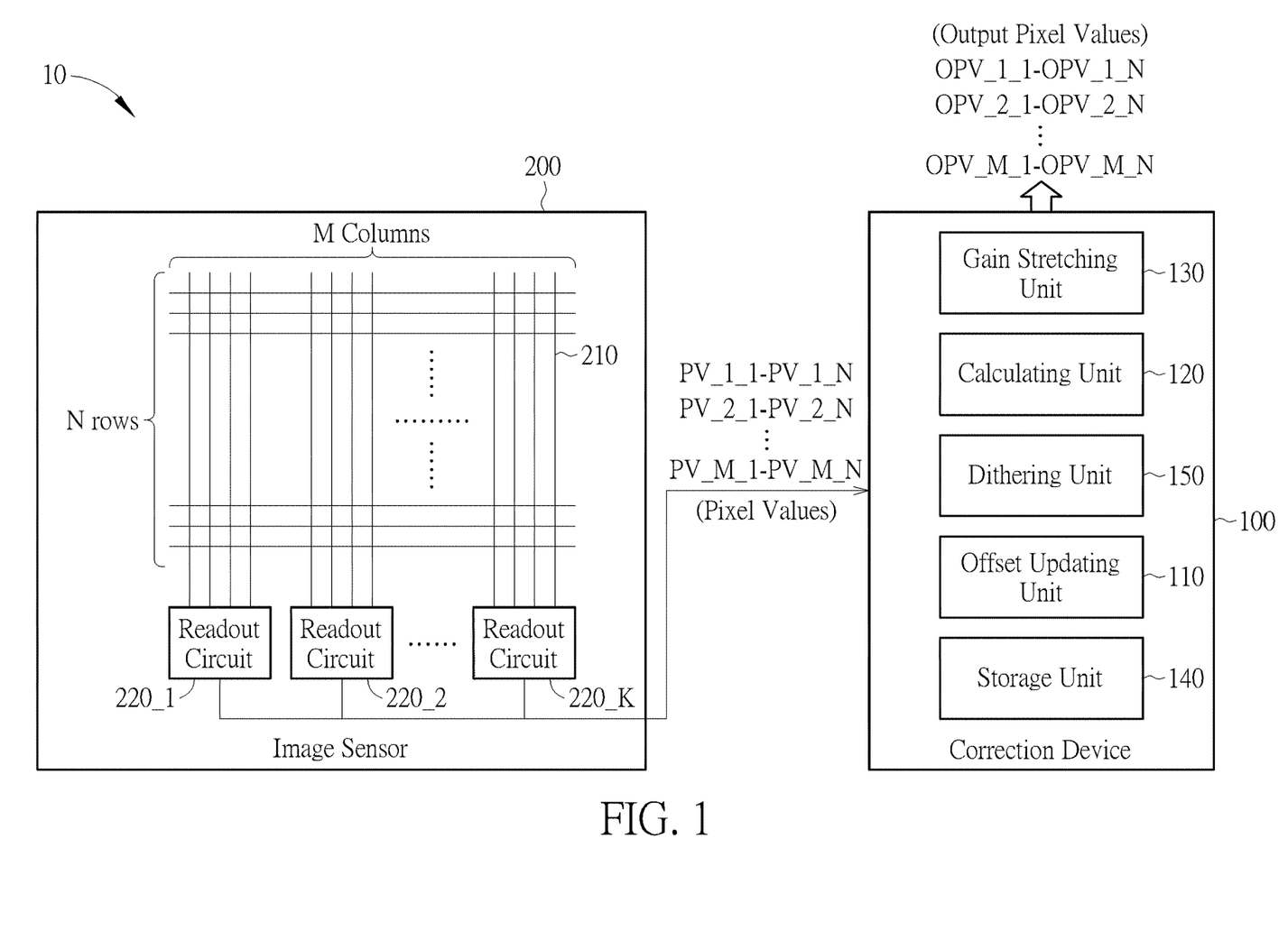
FIG. 1 illustrates a correction device and a corresponding image sensing device according to one embodiment of the present invention.

Please refer to FIG. 1, which illustrates a correction device and a corresponding image sensing device according to one embodiment of the present invention. As illustrated, a correction device 100 of an image sensing device 10 is configured for handling column fixed pattern noise (CFPN) of an image sensor 200 of the image sensing device 10. The correction device 100 comprises an offset updating unit 110, a calculating unit 120, a gain stretching unit 130 and a storage unit 140. On the other hand, the image sensor 200 comprises a pixel array 210 and a plurality of readout circuits 220_1-220_K. The pixel array 210 comprises a plurality of pixels arranged in a form of matrix, which could include M columns and N rows of pixels (i.e., M×N pixels).

The readout circuits 220_1-220_K are configured to convert charges sensed on pixels of the pixel array 210 into a plurality of (digital) pixel values (i.e., gray-level values). Typically, each of readout circuits 220_1-220_K is coupled to one or more column of pixels of the pixel array 210 and accordingly to read out one or more columns of pixel values from the pixel array 210. Please note that even though each four columns of pixels of the pixel array 210 shares one readout circuit in the embodiment of the present invention, which is not limitation of the present invention. Through the readout circuits 220_1-220_K, a plurality of columns of pixel values PV_1_1-PV_1_N (Column 1), PV_2_1-PV_2_N (Column 2) ... and PV_M_1-PV_M_N (Column M) will be outputted to and corrected by the correction device 100.

The offset updating unit 110 is configured to generate a plurality of updated offset values (which is M updated offset values in this embodiment) respectively corresponding to the plurality of columns of pixel values PV_1_1-PV_1_N (Column 1), PV_2_1-PV_2_N (Column 2) ... and PV_M_1-PV_M_N (Column M) according to a plurality of base offset values. Specifically, the offset updating unit 110 is configured to read the plurality of base offset values from the storage unit 140 and obtain the plurality of updated offset values by selecting specific ones of the plurality of base offset values.

Figure 2:
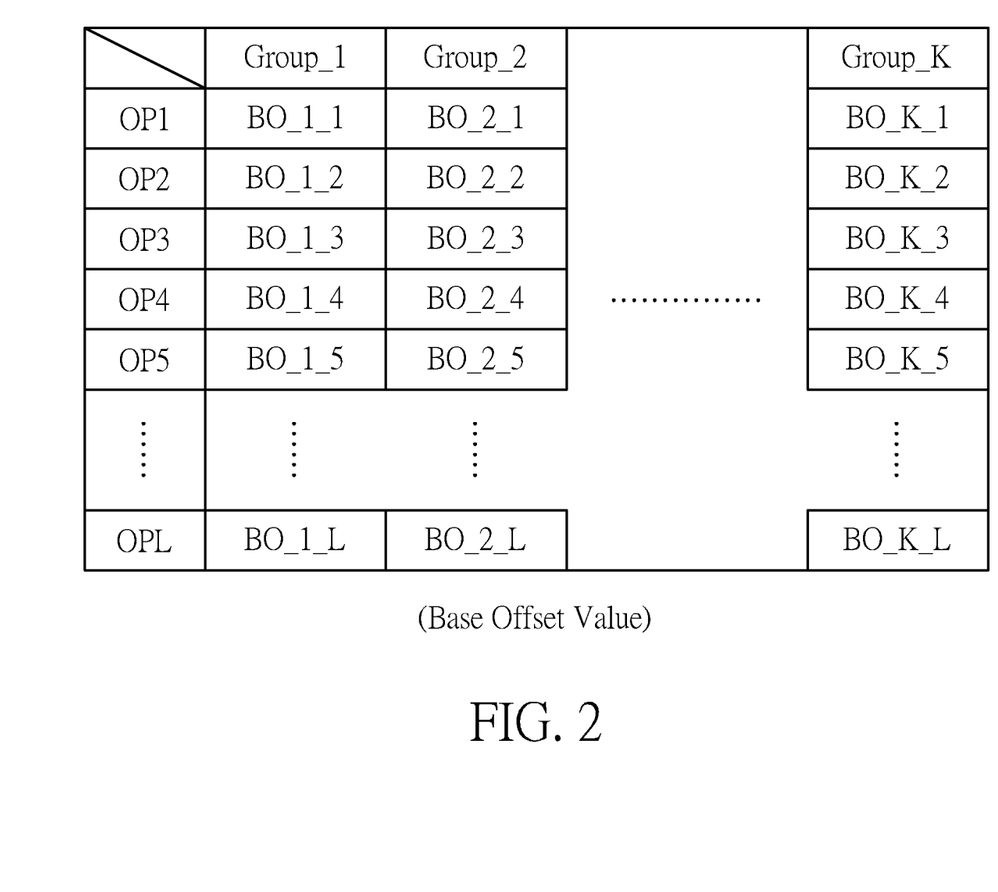
FIG. 2 illustrates data structure of base offset values stored in a storage unit according to one embodiment of the present invention.

Please refer to FIG. 2, which illustrates data structure of base offset values stored in the storage unit 140 according to one embodiment of the present invention. As illustrated, base offset values BO_1_1-BO_1_L, BO_2_1-BO_2_L . . . and BO_K_1-BO_K_L stored in the storage unit 140 are grouped in multiple groups Group_1-Group_K. Each of groups Group_1-Group_K of base offset values corresponds to CFPN correction regarding a specific one of readout circuits 220_1-220_K. The CFPN correction regarding readout circuits 220_1-220_K can be determined by a correction data collecting process for collecting readout circuit offset values. During the correction data collecting process, the image sensor 200 is operated under a specific operational condition (i.e., specific gain, aperture, and/or shutter speed settings) to capture test images with a uniform level of brightness. Subsequently, data read out from readout circuits 220_1-220_K of the image sensor is compared with pixel data of these test images, thereby to determine offset values for each of readout circuit 220_1-220_K, which represent the deviation from the expected output under the given operational conditions. The process is then repeated under different operational conditions to comprehensively gather the offset values of each of readout circuit 220_1-220_K across a range of scenarios. Through the above process, the base offset values BO_1_1-BO_1_L, BO_2_1-BO_2_L . . . and BO_K_1-BO_K_L can be determined.

Moreover, each of groups Group 1-Group_K of base offset values comprises multiple base offset values corresponds to various operational conditions of the image sensor 200. Taking base offset values BO_1_1-BO_1_L of the group Group_1 as an example, base offset value BO_1_1 may correspond to an operational condition OP1 directed to a first gain (i.e., sensitivity setting) of the image sensor 200, which means the base offset value BO_1_1 is used to reduce CFPN of the readout circuit 220_1 of the image sensor 200 when the image sensor 200 is operated with the first gain. In addition, base offset value BO_1_4 may correspond to an operational condition OP4 directed to a first shutter speed (i.e., exposure setting) of the image sensor 200, which means the base offset value BO_1_4 is used to reduce CFPN of the readout circuit 220_1 of the image sensor 200 when the image sensor 200 is operated with the first shutter speed. According to various embodiments, various operational conditions OP1-OPL may be directed to at least one of gain, aperture, shutter speed, and output resolution settings of the image sensor 200 or their combinations. For example, base offset values BO_1_5 may correspond to an operational condition OP5 directed to a combination of multiple settings of the image sensor 200, including a first gain, a first shutter speed and a first aperture.

In view of this, when processing a specific column of pixel values, the offset updating unit 110 firstly selects a corresponding group of base offset values from the groups Group_1-Group_K of base offset values. For example, if the offset updating unit 110 is handling the column of pixels values that is read out by the readout circuits 220_2, the offset updating unit 110 would select the group Group_2 of base offset values. Moreover, in a pixel-binning readout manner, since a single column of pixels values may be derived by values read out by more than one of readout circuits 220_1-220_K, the offset updating unit 110 would use multiple ones of groups of Group_1-Group_K of base offset values to generate an updated offset value for handling a single column of pixels values in the pixel-binning readout manner.

Once one or more groups (for pixel-binning) of Group_1-Group_K of the base offset values is selected, the offset updating unit 110 determines an operational condition (i.e., gain, aperture, and/or shutter speed setting) that the image sensor 200 is currently being operated in. Based on the determined operational condition, the offset updating unit 110 selects a corresponding base offset value from the selected group of base offset values. For example, after the group Group_2 of base offset values is selected, the offset updating unit 110 selects one of the base offset values BO_2_1-BO_2_L included in the group Group_2 of base offset values according to the operational condition.

In some embodiments, the selected base offset value may not be exactly consistent with the operational condition that the image sensor 200 is currently being operated in since the limited size of the storage unit 140. It is not cost effective and impracticable to store base offset values regarding all possible operational conditions of the image sensor 200. That is, the base offset values BO_1_1-BO_1_L, BO_2_1-BO_2_L . . . and BO_K_1-BO_K_L stored in the storage unit 140 may only correspond to a limited number of operational conditions of the image sensor 200.

Figure 3:
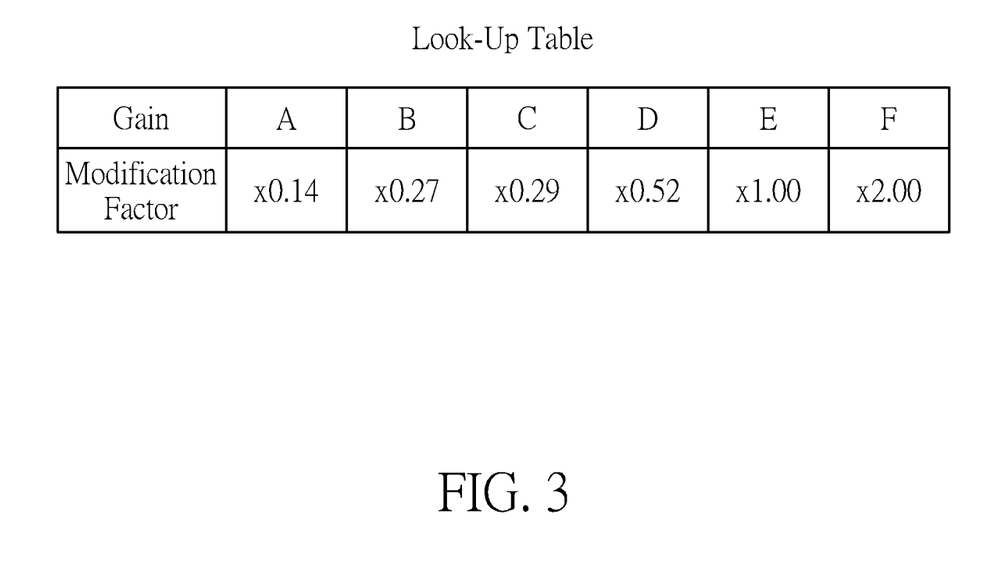
FIG. 3 illustrates a look-up table between gains and modification factors for base offset values according to one embodiment of the present invention.

In view of this, the offset updating unit 110 may modify the selected base offset value through a mapping relationship. Please refer to FIG. 3 for further understandings. FIG. 3 illustrates a look-up table according to one embodiment of the present invention. The look-up table of FIG. 3 indicates modification factors correspond to different possible gains of the image sensor 200. For example, the base offset values BO_2_1-BO_2_L included in the group Group_2 of base offset values may only be directed to the operational conditions where the image sensor 200 is operated with a gain A rather than gains B-F. Through the look-up table of FIG. 3, the offset updating unit 110 modifies the base offset values BO_2_1-BO_2_L according to a modification factor that is associated with the actual gain the image sensor 200 is operated with to obtain the updated offset value for following CFPN correction. Please note that the above modification is not necessary if the base offset values stored in the storage unit 140 could cover all the operations conditions of the image sensor 200.

Through the modification process explained above, the offset updating unit 110 would generate the updated offset value (with or without being processed by the modification factors) for correcting each column of pixel values. Accordingly, the calculation unit 120 is configured to generate a plurality of columns of corrected pixel values by adding or subtracting one updated offset value to or from its corresponding column of pixel values.

In some embodiments, the correction device 100 may further comprise a dithering unit 150. Please refer to FIG. 4 for further understandings. The dithering unit 150 is configured to control the calculating unit 120 to apply CFPN correction according to the plurality of updated offset values and the plurality of columns of pixel values. Specifically, the base offset values stored in the storage unit 140 and the updated offset value generated by the offset updating unit 110 may be a non-integer, while the pixel values generated by the image sensor 200 may be integers. The base offset values stored in the storage unit 140 and the updated offset value can be represented by (n+m+1) bits, wherein the n bits can represent an integral part of each of the base offset values and each of the updated offset values, while the m bits can represent a fractional part of each of the base offset values and each of the updated offset values and the 1 bit can represent the sign (positive or negative) of each of the base offset values and each of the updated offset values. Moreover, n bits can be used to represent the integral part of each of the pixel values generated by the image sensor 200, each of corrected pixel values generated by the calculating unit 120, each of the output pixel values generated by the gain stretching unit 130 and each of the dithering values applied to the calculating unit 120, while 1 bit can be used to represent the sign (positive or negative) of each of the dithering values applied to the calculating unit 120.

Figure 4:
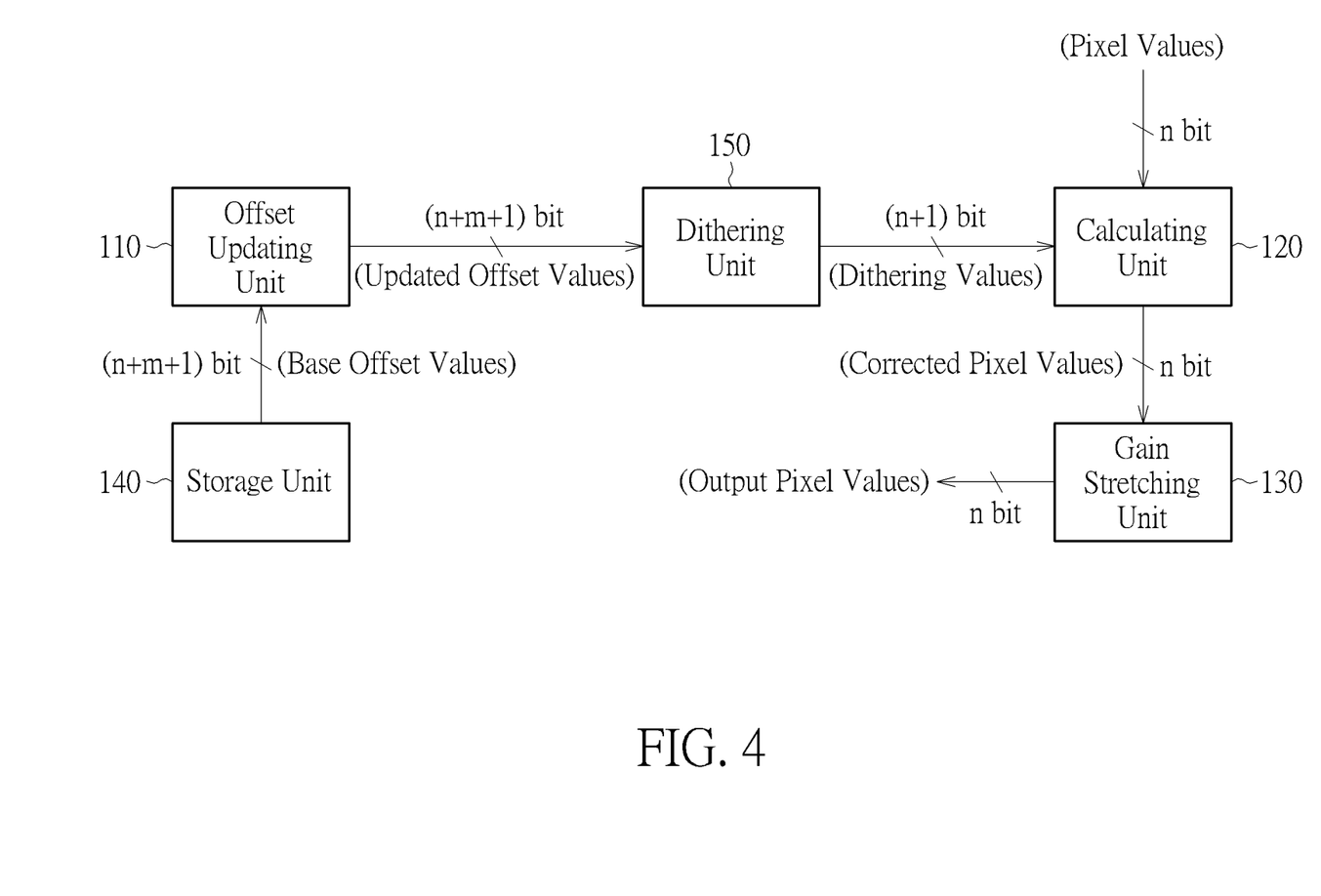
FIG. 4 illustrates a correcting device including a dithering unit according to one embodiment of the present invention.

When the calculating unit 120 applies a non-integral updated offset value to a column of pixel values to thereby generate a column of corrected pixel values, the dithering unit 150 would control the calculation unit 120 to add one or more dithering values to or subtract the one or more dithering values from only a portion of the column of pixel values according to a fractional part of the non-integral updated offset value. For example, assuming that the updated offset value generated by the offset updating unit 110 with respect to a column of pixel values is "+0.5" (i.e., a non-integral updated offset value), the dithering unit 150 would control the calculating unit 120 to add "1" (i.e., dithering value) to 50% of the column of pixel values and add "0" to 50% of the column of pixel values. Moreover, assuming that the updated offset value generated by the offset updating unit 110 with respect to a column of pixel values is "−1.75" (i.e., a non-integral updated offset value), the dithering unit 150 would control the calculation unit 120 to subtract "2" (i.e., a dithering value) from 75% of the column of pixel values and subtract "1" (i.e., a dithering value) from 25% of the column of pixel values. However, the dithering unit 150 may not be necessary if all the updated offset values generated by the offset updating unit 110 are integers.

After the calculating unit 120 generates the plurality of column of corrected pixels value, the gain stretching unit 130 would determine a compensation gain for compensating the plurality column of corrected pixels value. Specifically, the gain stretching unit 130 determines the compensation gain according to a maximum value of the plurality of updated offset values. In one embodiment, the compensation gain could be determined by: (PV_Max)/(PV_Max−UO_Max), where the term PV_Max is a possible maximum pixel value generated by the readout circuits 220_1-220_K and the term UO_Max is a maximum value of the plurality of updated offset values generated by the offset updating unit 110. The possible maximum pixel value PV_Max could vary with a bit-depth of the image sensor 200. For a 10-bit image sensor 200, the maximum pixel value PV_Max could be 1023 (i.e., $2^{10}-1$). The gain stretching unit 130 would generate a plurality of columns of output pixel values OPV_1_1-OPV_1_N (corresponding to Column 1), OPV_2_1-OPV_2_N (corresponding to Column 2) . . . and OPV_M_1-OPV_M_N (corresponding to Column M) by multiplying the plurality of columns of corrected pixel values by the compensation gain. As a result, the plurality of columns of output pixel values OPV_1_1-OPV_1_N (corresponding to Column 1), OPV_2_1-OPV_2_N (corresponding to Column 2) . . . and OPV_M_1-OPV_M_N (corresponding to Column M) can be considered as CFPN-free pixel values of the image sensor 200.

Figure 5:
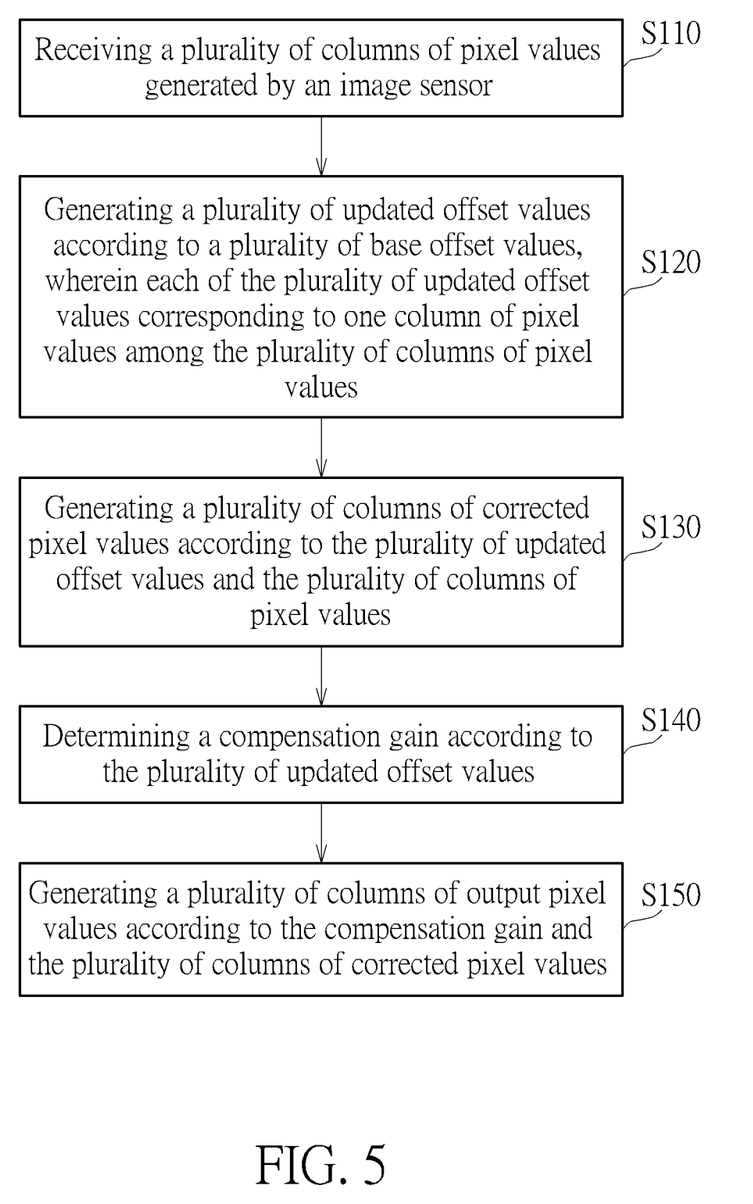
FIG. 5 illustrates a flow chart of a correction method of handling CFPN of an image sensor according to one embodiment of the present invention.

FIG. 5 illustrates a flow chart of a correction method of handling CFPN of an image sensor according to one embodiment of the present invention. As shown in the figure, the method of the present invention includes the following simplified flow:

S110: receiving a plurality of columns of pixel values generated by an image sensor;

S120: generating a plurality of updated offset values according to a plurality of base offset values, wherein each of the plurality of updated offset values corresponding to one column of pixel values among the plurality of columns of pixel values;

S130: generating a plurality of columns of corrected pixel values according to the plurality of updated offset values and the plurality of columns of pixel values;

S140: determining a compensation gain according to the plurality of updated offset values; and S150: generating a plurality of columns of output pixel values according to the compensation gain and the plurality of columns of corrected pixel values.

Since principles and specific details of the foregoing steps have been explained in detail through the above embodiments, further descriptions will not be repeated here. It should be noted that the above flow may be possible, by adding other extra steps or making appropriate modifications and adjustments, to better improve the image quality of the image sensor and further improve performance and efficiency of CFPN correction.

In conclusion, the present invention introduces an innovative CFPN correction method and device. The present invention leverages a sophisticated gain stretching mechanism, designed to apply a dynamic compensation gain specifically tailored for CFPN correction. This compensation gain is adept at fine-tuning the pixel values that have undergone CFPN correction, with a particular emphasis on pixels nearing or achieving saturation levels. The present invention avoids the common pitfall where conventional CFPN correction, typically relying on readout circuit offset values, inadvertently reduces pixel values. Such reduction often results in the creation of artificial and visually disruptive elements like stripes or spots in the final image output.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A correction method for handling column fixed pattern noise of an image sensor, comprising:
    receiving a plurality of columns of pixel values generated by the image sensor;
    generating a plurality of updated offset values according to a plurality of base offset values, wherein each of the plurality of updated offset values corresponding to one column of pixel values among the plurality of columns of pixel values;
    generating a plurality of columns of corrected pixel values according to the plurality of updated offset values and the plurality of columns of pixel values;
    determining a compensation gain according to the plurality of updated offset values; and
    generating a plurality of columns of output pixel values according to the compensation gain and the plurality of columns of corrected pixel values.

2. The correction method of claim 1, wherein the step of generating the plurality of updated offset values comprises:
    for each column of pixel values:
        selecting a specific group of base offset values from the plurality of base offset values for the column of pixel values according to an index of a readout circuit that the column of pixel values is read through; and
        determining a selected base offset value from the specific group of base offset values for the column of pixel values according to at least one operational condition of the image sensor; and
    generating the plurality of updated offset values according to the selected base offset value of each column of pixel values.

3. The correction method of claim 2, wherein the step of generating the plurality of updated offset values comprises:
    determining a modification factor according to the at least one operational condition of the image sensor; and
    generating each of the plurality of updated offset values according to the modification factor and the selected base offset value of each column of pixel values.

4. The correction method of claim 2, wherein the at least one operational condition corresponds to at least one of gain, aperture, shutter speed, and output resolution settings the image sensor.

5. The correction method of claim 1, wherein the step of generating the plurality of columns of corrected pixel values comprises:
    determining one or more dithering values corresponding to each of the plurality of updated offset values according to a fractional part of each of the plurality of updated offset values; and generating each column of corrected pixel values according to each column of pixel values and the one or more corresponding dithering values.

6. The correction method of claim 5, wherein the step of generating each column of corrected pixel values comprises:
applying the one or more dithering values to only a portion of the pixel values of each column of pixel values according to the fractional part of each of the plurality of updated offset values.

7. The correction method of claim 1, wherein the step of determining the compensation gain comprises:
determining the compensation gain according to a maximum value of the plurality of updated offset values and a maximum possible pixel value generated by the image sensor.

8. A correction device for handling column fixed pattern noise of an image sensor, comprising:
an offset updating unit, configured to generate a plurality of updated offset values according to a plurality of base offset values, wherein each of the plurality of updated offset values corresponding to one column of pixel values among a plurality of columns of pixel values generated by the image sensor;
a calculating unit, coupled to the offset updating unit, configured to generate a plurality of columns of corrected pixel values according to the plurality of updated offset values and the plurality of columns of pixel values; and
a gain stretching unit, coupled to the calculating unit, configured to determine a compensation gain according to the plurality of updated offset values and accordingly generate a plurality of columns of output pixel values according to the compensation gain and the plurality of columns of corrected pixel values.

9. The correction device of claim 8, wherein the offset updating unit is configured to:
for each column of pixel values:
select a specific group of base offset values from the plurality of base offset values for the column of pixel values according to an index of a readout circuit that the column of pixel values is read through;
determine a selected base offset value from the specific group of base offset values for the column of pixel values according to at least one operational condition of the image sensor; and
generate the plurality of updated offset values according to the selected base offset value of each column of pixel values.

10. The correction device of claim 9, wherein the offset updating unit is configured to:
determine a modification factor according to the at least one operational condition of the image sensor; and
generate each of the plurality of updated offset values according to the modification factor and the selected base offset value of each column of pixel values.

11. The correction device of claim 9, wherein the at least one operational condition corresponds to at least one of gain, aperture, shutter speed, and output resolution settings of the image sensor.

12. The correction device of claim 8, wherein further comprising:
a dithering unit, coupled to the calculating unit and the offset updating unit, configured to determine one or more dithering values corresponding to each the plurality of updated offset values according to a fractional part of each of the plurality of updated offset values;
wherein the dithering unit is configured to control the calculating unit to generate each column of corrected pixel values according to each column of pixel values and the one or more corresponding dithering values.

13. The correction device of claim 12, wherein the dithering unit is configured to control the calculating unit to apply the one or more dithering values to only a portion of the pixel values of each column of pixel values according to the fractional part of each of the plurality of updated offset values.

14. The correction device of claim 8, wherein the gain stretching unit is configured determine the compensation gain according to a maximum value of the plurality of updated offset values and a maximum possible pixel value generated by the image sensor.

15. An image sensing device, comprising:
an image sensor, configured to provide a plurality of columns of pixel values;
a correction device for handling column fixed pattern noise of the image sensor, comprising:
an offset updating unit, configured to generate a plurality of updated offset values according to a plurality of base offset values, wherein each of the plurality of updated offset values corresponding to one column of pixel values among the plurality of columns of pixel values;
a calculating unit, coupled to the offset updating unit, configured to generate a plurality of columns of corrected pixel values according to the plurality of updated offset values and the plurality of columns of pixel values; and
a gain stretching unit, coupled to the calculating unit, configured to determine a compensation gain according to the plurality of updated offset values and accordingly generate a plurality of columns of output pixel values according to the compensation gain and the plurality of columns of corrected pixel values.

* * * * *